Sept. 27, 1932.  G. A. CHADBOURNE  1,880,121
MOWING MACHINE
Filed Nov. 17, 1930  2 Sheets-Sheet 1
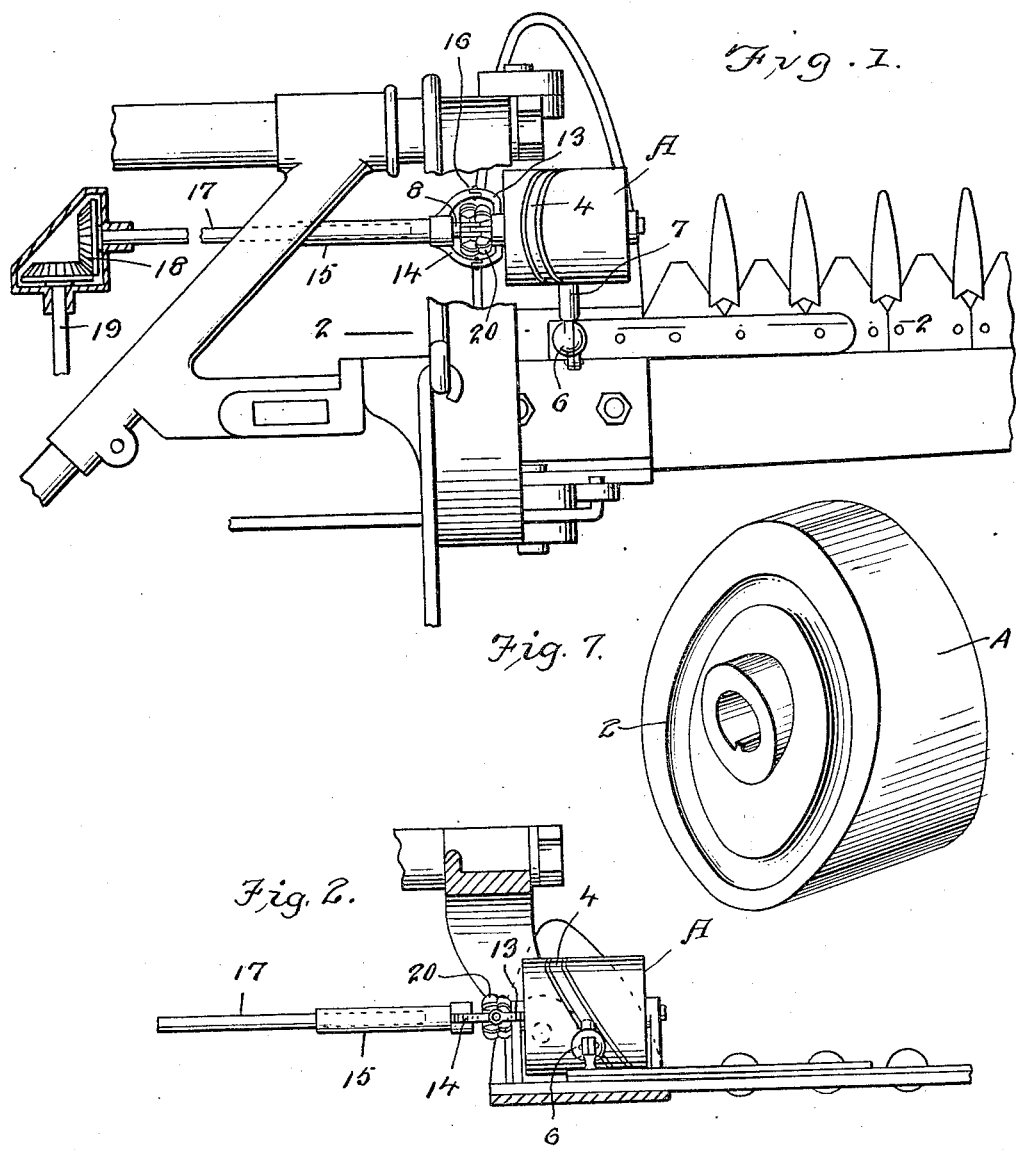

Sept. 27, 1932.  G. A. CHADBOURNE  1,880,121
MOWING MACHINE
Filed Nov. 17, 1930   2 Sheets-Sheet 2

G. A. Chadbourne
INVENTOR

BY Victor J. Evans
and G. L. Evans ATTORNEYS

Patented Sept. 27, 1932

1,880,121

UNITED STATES PATENT OFFICE

GLENN A. CHADBOURNE, OF CHADBORN, MONTANA

MOWING MACHINE

Application filed November 17, 1930. Serial No. 496,260.

This invention relates to means for reciprocating the sickle bar of a mowing machine from a shaft of the machine, the general object of the invention being to provide means whereby the sickle bar can be reciprocated while in a horizontal position or in various positions at an incline to the horizontal.

Another object of the invention is to provide a rotary drum having a cam groove therein and a ring member rotatably supported in the groove and connected with the sickle bar so that the rotary movement of the drum will cause the ring member to reciprocate the bar.

This invention also consists in certain other features of construction and in the combination and arrangement of the several parts, to be hereinafter full described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of a portion of a mowing machine, showing the invention in use.

Figure 2 is a sectional view through part of Figure 1, taken on the line 2—2 of Figure 1.

Figure 7 is a perspective view of one section of the cam drum.

Figure 3:
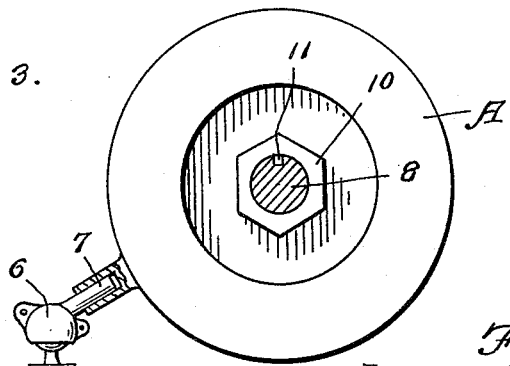
Figure 3 is an end view of the cam drum, with parts in section.
Figure 4:
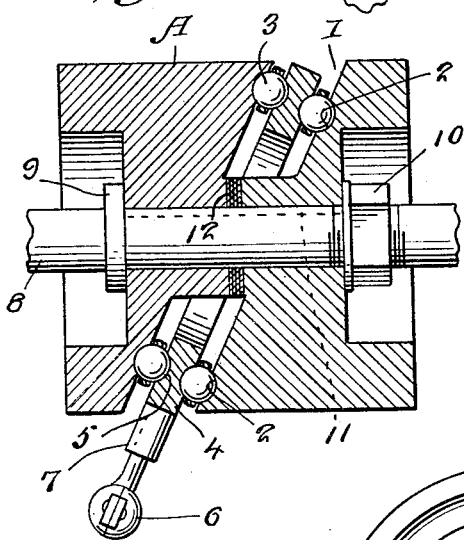
Figure 4 is a longitudinal sectional view through the cam drum.
Figure 5:
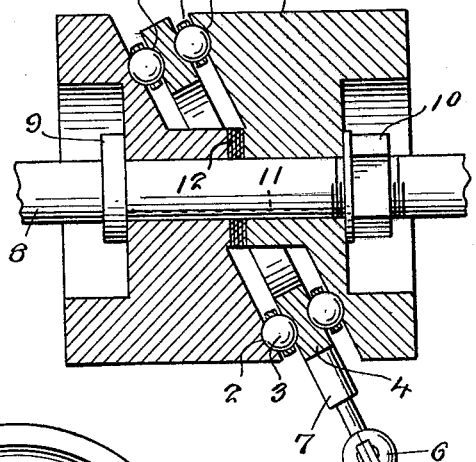
Figure 5 is a similar view, but showing the parts in a different position.
Figure 6:
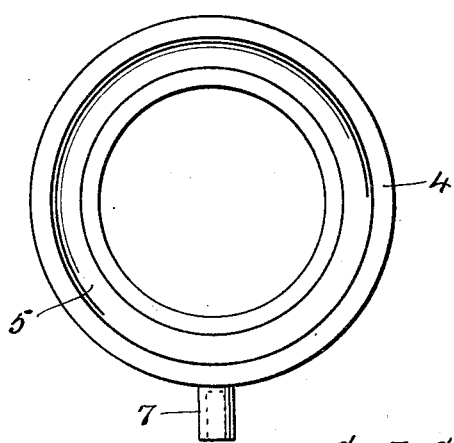
Figure 6 is a view of the ring member.

In these drawings, the letter A indicates a drum having a diagonally arranged annular groove 1 therein, the opposing walls of which are formed with the raceways 2 for the spherical members 3 and a ring member 4 is rotatably arranged in the groove and is formed with the raceways 5 for the two sets of spherical members.

Thus as the drum A is rotated, the ring member is given a rocking or oscillatory movement so that a member connected with the ring member will be reciprocated.

The drawings show the ring member connected to the knife bar of a mowing machine through means of a universal joint 6 and a slip connection 7 so that the bar will be reciprocated by the movement of the ring member.

The drawings also show the drum as composed of two sections placed on a shaft 8 having a collar 9 thereon against which the outer end of one section bears, with a nut 10 on a threaded part of the shaft for holding the other section against the first section and the drum on the shaft. The drum is also keyed to the shaft, as shown at 11, and shims 12 are placed between the sections to permit adjustment of the sections to compensate for wear.

A yoke 13 is connected with the shaft 8 and a second yoke 14 is connected with a socketed shaft 15 and the yokes are pivotally connected together, as shown at 16. A shaft 17 fits in the socket of the shaft 15 and said shaft 17 is connected by the gears 18 with a shaft 19 rotated in the usual or any desired manner, from a ground wheel of the mower, or in any other suitable manner. The universal joint 20 connects the shafts 8 and 15 in such a manner that motion will be imparted to the shaft 8 from the shaft 15, regardless of the position of the drum, so that the drum and sickle bar can be raised and lowered without interfering with the driving connection, which permits the sickle bar to be adjusted in accordance with the lay of the land.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In a mowing machine, a rotary drum having a diagonally disposed annular groove therein, a ring fitted in the groove for oscillatory movement on the rotation of the drum, a cutter bar mounted for reciprocation adjacent to said drum, an arm extending from the ring and having ball and socket connection with said cutter bar, and a driving element connected with the drum for rotating the same.

2. In a mowing machine, a rotary drum having a diagonally disposed annular groove therein, a ring fitted in the groove for oscillatory movement on the rotation of the drum, a cutter bar mounted for reciprocation adjacent to said drum, an arm extending from the ring and having ball and socket connection with said cutter bar, and a driving element connected with the drum for rotating the same, the said drum being formed of separable sections and having its separated joint at the groove therein.

In testimony whereof I affix my signature.

GLENN A. CHADBOURNE.